(12) United States Patent
Shamoto et al.

(10) Patent No.: US 6,731,957 B1
(45) Date of Patent: May 4, 2004

(54) WIRELESS COMMUNICATION DEVICE CAPABLE OF SAVING BATTERY POWER BY SWITCHING COMMUNICATION MODE

(75) Inventors: Michio Shamoto, Niwa-gun (JP); Masao Tsujii, Nagoya (JP); Hiroshi Sakai, Toyota (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/490,256

(22) Filed: Jan. 24, 2000

(30) Foreign Application Priority Data

Feb. 10, 1999 (JP) .......................................... 11-032689

(51) Int. Cl.$^7$ ................................................ H04B 7/00
(52) U.S. Cl. .................... 455/574; 455/426; 455/552.1; 455/403; 455/90.1; 455/425; 455/522; 455/523; 455/24.1
(58) Field of Search ........................... 455/426, 552.1, 455/403, 574, 90.1, 425, 24.1, 522, 523; 379/63, 57

(56) References Cited

U.S. PATENT DOCUMENTS

| | | | | |
|---|---|---|---|---|
| 5,497,507 A | * | 3/1996 | Komaki | ....................... 455/127 |
| 5,526,398 A | * | 6/1996 | Okada et al. | ................. 340/7.1 |
| 5,594,782 A | * | 1/1997 | Zicker et al. | ................ 455/417 |

* cited by examiner

*Primary Examiner*—Sinh Tran
*Assistant Examiner*—David Q Nguyen
(74) *Attorney, Agent, or Firm*—Harness, Dickey & Pierce, PLC

(57) ABSTRACT

A PDC/PHS phone has both PDC communication function and PHS communication function. The PDC/PHS phone switches its communication mode from a PDC communication to a PHS communication which is less power consuming than the PDC communication, when its built-in battery runs down to a reference level in the course of communication with another phone. The PDC/PHS phone switches its communication mode back to the PDC communication again, when the battery is recharged enough.

19 Claims, 4 Drawing Sheets

WIRELESS COMMUNICATION DEVICE CAPABLE OF SAVING BATTERY POWER BY SWITCHING COMMUNICATION MODE

CROSS REFERENCE TO RELATED APPLICATION

This application relates to and incorporates herein by reference Japanese Patent Application No. 11-32689 filed on Feb. 10, 1999.

BACKGROUND OF THE INVENTION

The present invention relates to wireless communication devices capable of communicating through a plurality of wireless communication networks which operate under different communication protocols, and operating with different battery power consumption rates.

Various kinds of wireless communication devices are used for mobile communications. The devices include, for instance, personal digital cellular (PDC) type phones such as a cellular phone and a car phone, and personal handy phone (PHS) type devices developed as the second generation cordless phone.

The PDC phone is capable of providing communication services over a wide area because the service area of its base station (BS) is from 1.5 kilometers to several kilometers (macro cell) in radius, and is capable of providing communication services even when phone users are moving at high speeds. However, the cellular phones and the car phones consume more electric power, because a comparatively high transmission output power is required.

On the contrary, the PHS phone provides communication services over a limited area because the service area of its cell station (CS) is from 100 meters to several hundred meters (micro cell). The PHS phones consume less electric power, because a comparatively low transmission output power is required. However, the PHS phone is not capable of providing its services when phone users are moving at high speeds.

New type of cellular phones which are compatible with both the PDC phones and the PHS phones are proposed so that such phones are operable under different communication modes, that is, under the PDC communication protocol and the PHS communication protocol.

If such a cellular phone operable under both PDC protocol (PDC mode) and PHS protocol (PHS mode) is connected to the PDC communication network and operates under the PDC communication protocol, it consumes more electric power because of its high transmission output power. The electric energy of a built-in battery is consumed rapidly when a phone talk or a transmission of a large amount of data continues for a long period of time. The remaining capacity of the battery decreases quickly, occasionally resulting in that the talk or data transmission is disabled unexpectedly.

SUMMARY OF THE INVENTION

It is therefore an object of the present invention to provide a wireless communication device which is capable of avoiding unexpected disablement of communication even when a remaining power of a battery decreases rapidly in the course of communication.

According to the present invention, a wireless communication device is operable with a built-in battery and in different communication modes. The wireless communication device includes a first communication part capable of communication through a first external communication network under a first communication mode, and a second communication part capable of communication through a second external communication network under a second communication mode which is less power-consuming than the first communication part. When a battery power decreases too much, an operable communication part of the wireless communication device is switched from the first communication part to the second communication part thereby to connect the second communication part to the second external communication network and disconnect the first communication part from the first external communication network, thereby reducing the power consumption of the battery.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to its presently preferred exemplary embodiments in which a cellular phone is made compatible with both a personal digital cellular (PDC) type communication system and a personal handy phone system (PHS) type communication system. That is, the cellular phone is operable under the PDC mode or PHS mode.

First Embodiment

Figure 1:
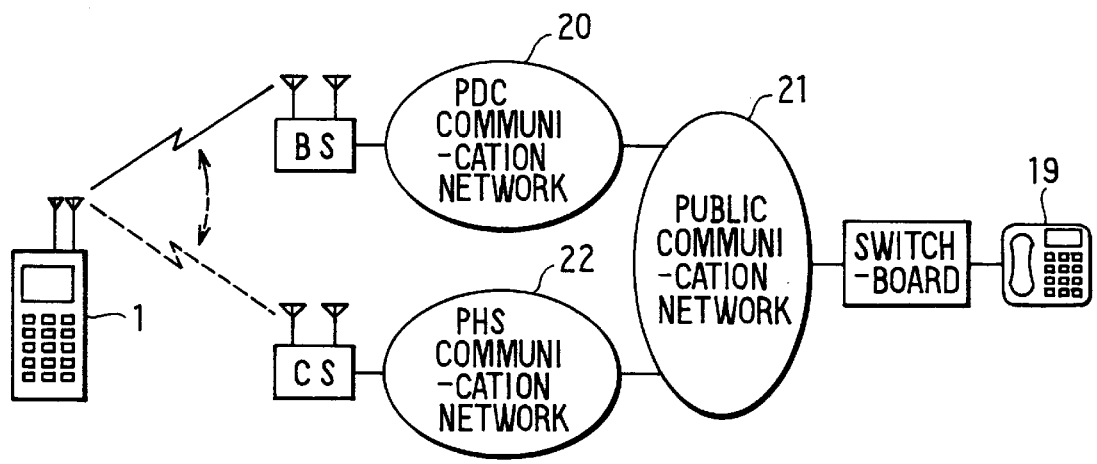
FIG. 1 is a schematic diagram showing a communication network in a wireless communication system in which a wireless communication device according to a first embodiment of the present invention is used.

Referring first to FIG. 1, a cellular phone (PDC/PHS) phone 1 which is capable of communications under the PDC protocol and PHS protocol is shown as connectable to a landline home phone 19 through a PDC communication network 20, a public communication network 21, a PHS communication network 21, and the like (switchboard, base station for PDC communication and cell station for PHS communication). The public communication network 21 includes a public switched telephone network (PSTN) and an integrated service digital network (ISDN). Although not shown in the figure, the networks 20, 21 and 22 are connected to other communication networks in the known manner.

Figure 2:
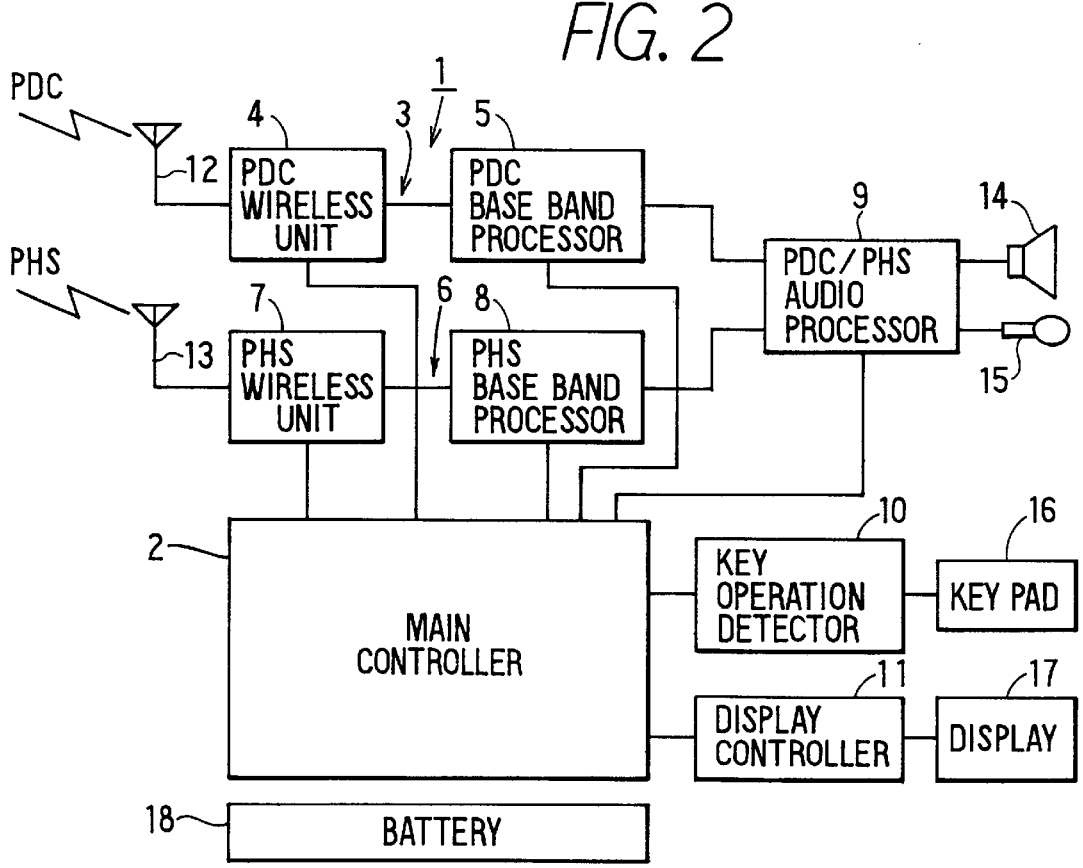
FIG. 2 is a block diagram showing the wireless communication device of the first embodiment.

The PDC/PHS phone 1 has, as shown in FIG. 2, a main controller 2 primarily comprising a microcomputer. The main controller 2 is connected with a PDC communication part 3 including a PDC wireless unit 4 connected to an antenna 12 and a PDC base band processor 5, a PHS communication part 6 including a PHS wireless unit 7 connected to an antenna 13 and a PHS base band processor 8, and a PDC/PHS audio processor 9 connected to a speaker 14 and a microphone 15. The main controller 2 is also connected to a key operation detector 10 connected to a keypad 16, a display controller 11 connected to a display 17, and a rechargeable built-in battery 18.

The PDC wireless unit 4 of the PDC communication part 3 has a receiver circuit, a demodulator circuit and the like. When the PDC antenna 12 receives a radio signal in the 1.5 GHz frequency band, the wireless unit 4 performs signal receiving and demodulating processes to produce a reception signal to the base band processor 5.

The PDC wireless unit 4 also has a modulator circuit, a d.c./a.c. modulator circuit, a power amplifier circuit and the like. When a transmission signal is applied from the PDC base band processor 5, the wireless unit 4 performs a modulation, d.c./a.c. modulation and amplification of the transmission signal to transmit it from the PDC antenna 12 as a radio signal.

The PDC base band processor 5 is constructed as a TDMA (time-divided multiple access) control circuit. When the reception signal is applied, the PDC base band processor 5 performs the TDMA processing on the reception signal to produce a processed reception signal to the PDC/PHS audio processor 9. Further, the PDC base band processor 5 performs the TDMA processing on the transmission signal applied from the PDC/PHS audio processor 9 to produce a processed transmission signal to the wireless unit 4.

The PHS wireless unit 7 of the PHS communication unit 6 is basically constructed in the same manner as the PDC wireless unit 4. However, the PHS wireless unit 7 is constructed to process the reception signal and the transmission signal in the 1.9 GHz frequency band which complies with the PHS system communication protocol, while the PDC wireless unit 4 is constructed to process the reception signal and the transmission signal in the 1.5 GHz frequency band which complies with the PDC system communication protocol.

That is, the PHS wireless unit 7 also has a receiver circuit, a demodulator circuit and the like. When the PHS antenna 13 receives the radio signal in the 1.9 GHz frequency band, the wireless unit 7 performs signal receiving and demodulating processes to produce a reception signal to the base band processor 8.

The PHS wireless unit 7 also has a modulator circuit, a d.c./a.c. modulator circuit, a power amplifier circuit and the like. When a transmission signal is applied from the PHS base band processor 8, the wireless unit 7 performs a modulation, d.c./a.c. modulation and amplification of the transmission signal to transmit it from the PHS antenna 13 as a radio signal.

The PHS base band processor 8 of the PHS communication unit 6 is basically constructed in the same manner as the PDC base band processor 5. However, the PHS base band processor 8 is constructed to process the reception signal and the transmission signal in the 1.9 GHz frequency band which complies with the PHS system communication protocol, while the PDC base band processor 5 is constructed to process the reception signal and the transmission signal in the 1.5 GHz frequency band which complies with the PDC system communication protocol.

That is, the PHS base band processor 8 is also constructed as a TDMA (time-divided multiple access) control circuit. When the reception signal is applied from the PHS wireless unit 7, the PHS base band processor 8 performs the TDMA processing on the reception signal to produce a processed reception signal to the PDC/PHS audio processor 9. Further, the PHS base band processor 8 performs the TDMA processing on the transmission signal applied from the PDC/PHS audio processor 9 to produce a processed transmission signal to the wireless unit 7.

The PDC/PHS audio processor 9 has a digital signal processor circuit, an audio interface circuit and the like. When the reception signal is applied from the PDC base band processor 5 or the PHS base band processor 8, the audio processor 9 performs voice decoding processing, D/A conversion processing and the like on the applied reception signal to produce the processed reception signal to the speaker 14.

Further, when a voice signal is applied from the microphone 15, the PDC/PHS audio processor 9 also performs A/D conversion processing, voice coding processing and the like on the applied voice signal to produce the transmission signal to the PDC base band processor 5 or the PHS base band processor 8.

In the above PDC/PHS phone 1, the main controller 2 controls the PDC communication part 3 (PDC wireless unit 4 and PDC base band processor 5) so that a message included in the reception signal is produced from the speaker 14 when the PDC antenna 12 receives the radio signal in the 1.5 GHz frequency band, and a radio signal in the 1.5 GHz frequency band is transmitted from the PDC antenna 12 when a message is input through the microphone 15.

Further, the main controller 2 controls the PHS communication part 6 (PHS wireless unit 7 and PHS base band processor 8) so that a message included in the reception signal is produced from the speaker 14 when the PHS antenna 13 receives the radio signal in the 1.9 GHz frequency band, and a radio signal in the 1.9 GHz frequency band is transmitted from the PHS antenna 13 when a message is input through the microphone 15.

The main controller 2 further controls the PDC/PHS audio processor 9 so that the audio processor 9 produces a message signal in response to a control signal applied from the main controller 2. Thus, the speaker 14 produces messages in audible sound in response to message signals from the audio processor 9.

The keypad 16 has various keys (buttons) for turning on or off power, starting communication, ending communication, inputting numbers 0 to 9, and other functions. When the keypad 16 is operated by a user, the key operation detector 10 outputs detection signals to the main controller 2 in correspondence with the operated keys. The main controller 2 performs corresponding processing in response to the detection signals.

The display 17 has a liquid crystal display (LCD) panel. The display controller 12 drives the display 17 to display messages thereon in response to display control signals from the main controller 2.

The battery 18 is detachably mounted in the PDC/PHS phone 1, so that it supplies electric power to the above electronic circuits and devices as long as the PDC/PHS phone 1 is powered on to perform the above operations.

It is to be noted that the electric power consumption of the PDC/PHS phone 1 is larger when its PDC communication part 3 operates for the PDC communication through the PDC communication network 20 than when its PHS communication part 6 operates for the PHS communication through the PHS communication network 22. This is because, the PDC/PHS phone 1 is required to transmit its radio signal with higher output power from the antenna 12 to the PDC communication network 20 than from the antenna 13 to the PHS communication network 22.

In the communication system shown in FIG. 1, when a user of the home phone 19 dials a PDC phone number assigned to the PDC/PHS phone 1, the dialed signal is transmitted to the public communication network 21 through a switchboard. The public communication network 21 performs switching operation with the PDC communication network 20 to transmit a radio signal from the PDC communication network 20 to the PDC/PHS phone 1. When a user of the PDC/PHS phone 1 responds to this radio signal, the PDC/PHS phone 1 transmits a radio signal of response to the PDC communication network 20. Thus, the PDC/PHS phone 1 is connected to the PDC communication network 20 for a continued communication with the home phone 19 under the PDC protocol.

Figure 3:
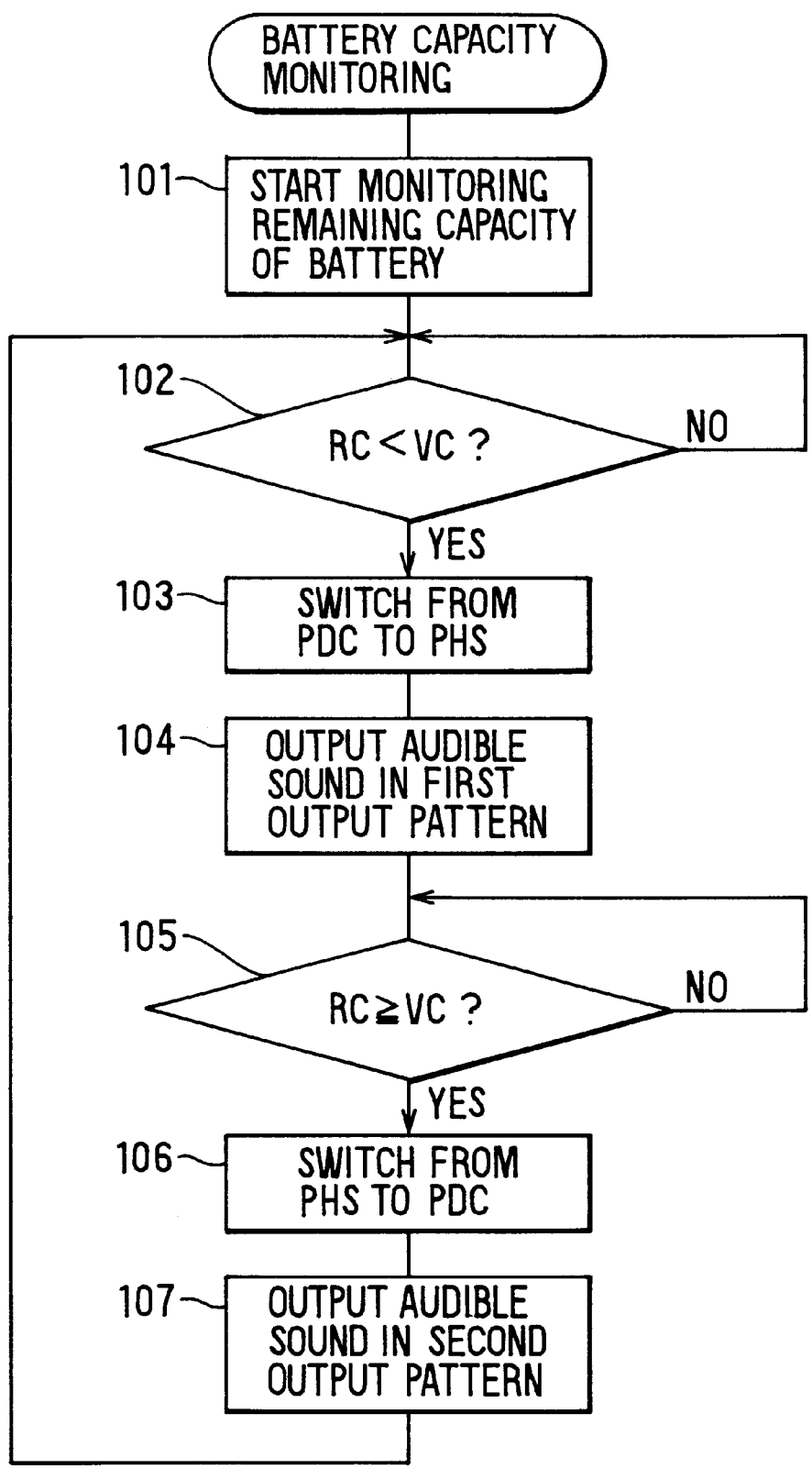
FIG. 3 is a flow diagram showing a battery capacity monitoring program of the wireless communication device of the first embodiment.

When the PDC/PHS phone 1 is thus connected to the PDC communication network 22, the main controller 2 of the PDC/PHS phone 1 performs predetermined communication processing (not shown), and also a battery capacity monitoring processing in the course of continued communication as shown in FIG. 3.

Specifically, the main controller 2 starts monitoring the remaining capacity (e.g., battery voltage) RC of the battery 18 at step 101, and then compares the monitored capacity RC with a predetermined reference level Vc at step 102. If the monitored capacity RC decreases below the reference level Vc (time t1 in FIG. 4, for instance), the comparison result becomes YES indicating that the battery is running down due to continued communication for a long period of time.

Figure 4:
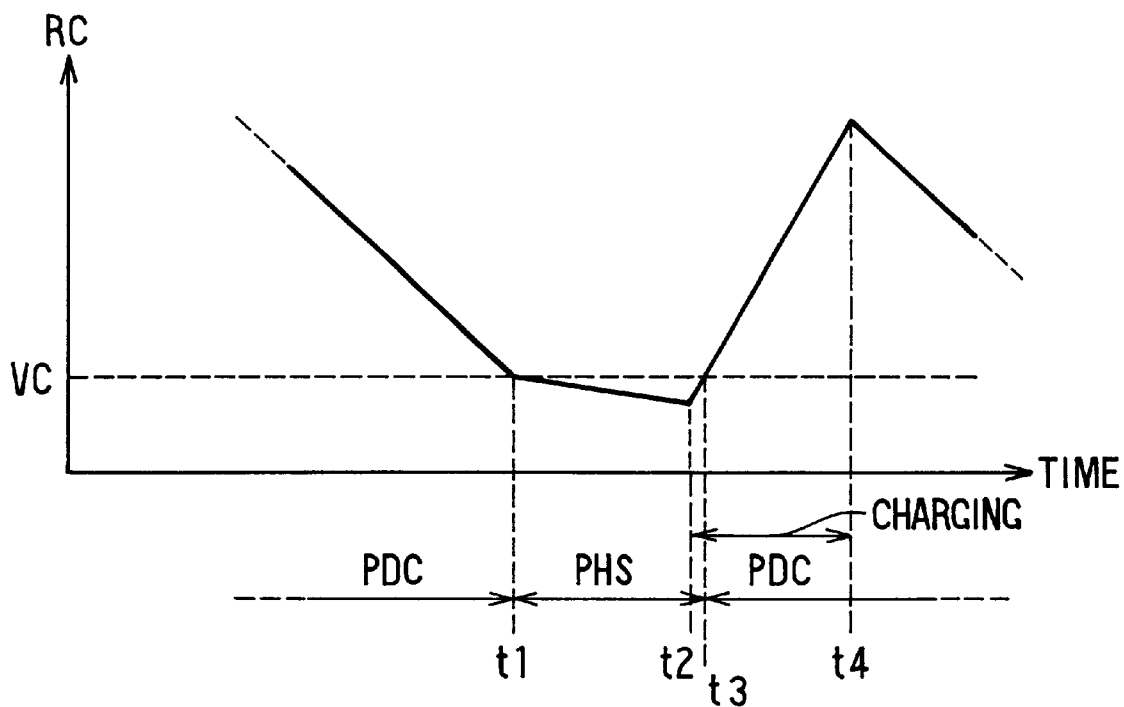
FIG. 4 is a timing diagram showing an operation of the wireless communication device of the first embodiment.

The main controller 2 switches from the PDC communication to the PHS communication at step 103. That is, it causes the PHS communication part 6 to be connected to the PHS communication network 22 to enable the communication having been performed through the PDC communication network 20 to be continued through the PHS communication network 22. The PDC communication part 3 is disconnected from the PDC communication network 20. Thus, the rate of power consumption of the PDC/PHS phone 1 is decreased owing to switching from the PDC communication to the PHS communication, because the PHS communication part 6 requires less electric power for PHS communication than the PDC communication part 3 requires for PDC communication. The rate of decrease in the remaining capacity of the battery 18 is slowed down after time t4 than before time t4 as shown in FIG. 4.

The main controller 2 outputs a control signal to the PDC/PHS audio processor 9 at step 104 to drive the speaker 14 to produce an audible sound of a fixed frequency in a first predetermined output pattern. This sound informs the user of the PDC/PHS phone 1 that the battery 18 is running down and hence the communication is maintained under the PHS communication system. Thus, the user of the PDC/PHS phone 1 is enabled to recognize that the present communication should be terminated soon or the battery 18 should be recharged at the earliest possible time. If recharging the battery 18 is started at time t2 in the middle of communication, the remaining power RC increases as shown in FIG. 4 after time t2.

The main controller 2 then compares the monitored capacity RC with the predetermined reference level vc at step 105. If the monitored capacity RC increases to the reference level Vc (time t3 in FIG. 4) again, the comparison result becomes YES indicating that the battery 18 is restoring its power.

The main controller 2 switches from the PHS communication back to the PDC communication at step 106. That is, it causes the PDC communication part 3 to be connected to the PDC communication network 20 to enable the communication having been performed temporarily through the PHS communication network 22 to be continued again through the PDC communication network 20. The PHS communication part 6 is disconnected from the PHS communication network 22.

The main controller 2 outputs a control signal to the PDC/PHS audio processor 9 at step 107 to drive the speaker 14 to produce the audible sound of the fixed frequency in a second predetermined output pattern which is different from the first predetermined output pattern. This sound informs the user of the PDC/PHS phone 1 that the battery 18 is restoring its power and hence the communication is maintained under the PDC communication system again. Thus, the user of the PDC/PHS phone 1 is enabled to recognize that the present communication can be maintained without worrying about shortage of the remaining power of the battery 18. The recharging of the battery may be ended at time t4 in FIG. 4, when the monitored capacity RC reaches a maximum, that is, the battery 18 is fully recharged.

According to the present embodiment, the mode of communication is switched from one (PDC) to another (PHS) which operates with less electric power than the one when the battery is running down to a level below which the communication is likely to be disabled unexpectedly. Thus, the decrease in the capacity of the battery can be slowed down to enable the continued communication for a longer period.

Further, the communication having been switched to another mode can be switched back immediately after the battery is recharged to a level required to maintain the original communication. As a result, the communication under another mode which may lessen a desired communication such as communication while moving at high speeds can be reduced to a minimum.

Second Embodiment

In a second embodiment, the PDC/PHS phone 1 is constructed to switch its communication mode at different reference levels.

Figure 6:
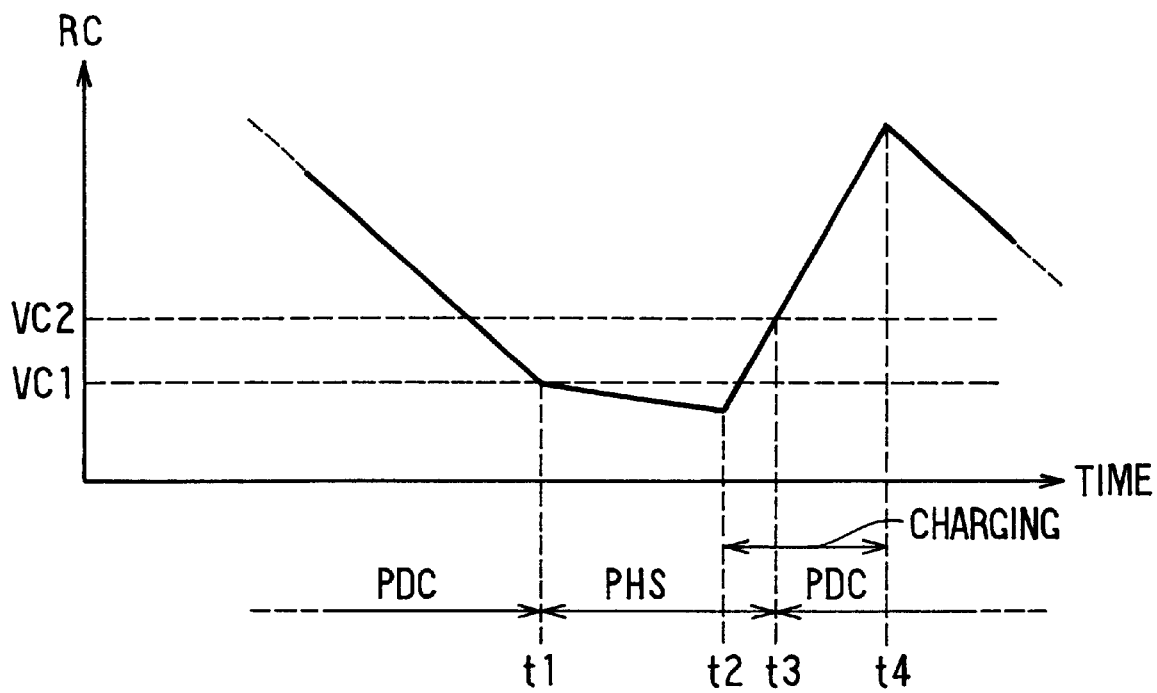
FIG. 6 is a timing diagram showing an operation of the wireless communication device of the second embodiment.
Figure 5:
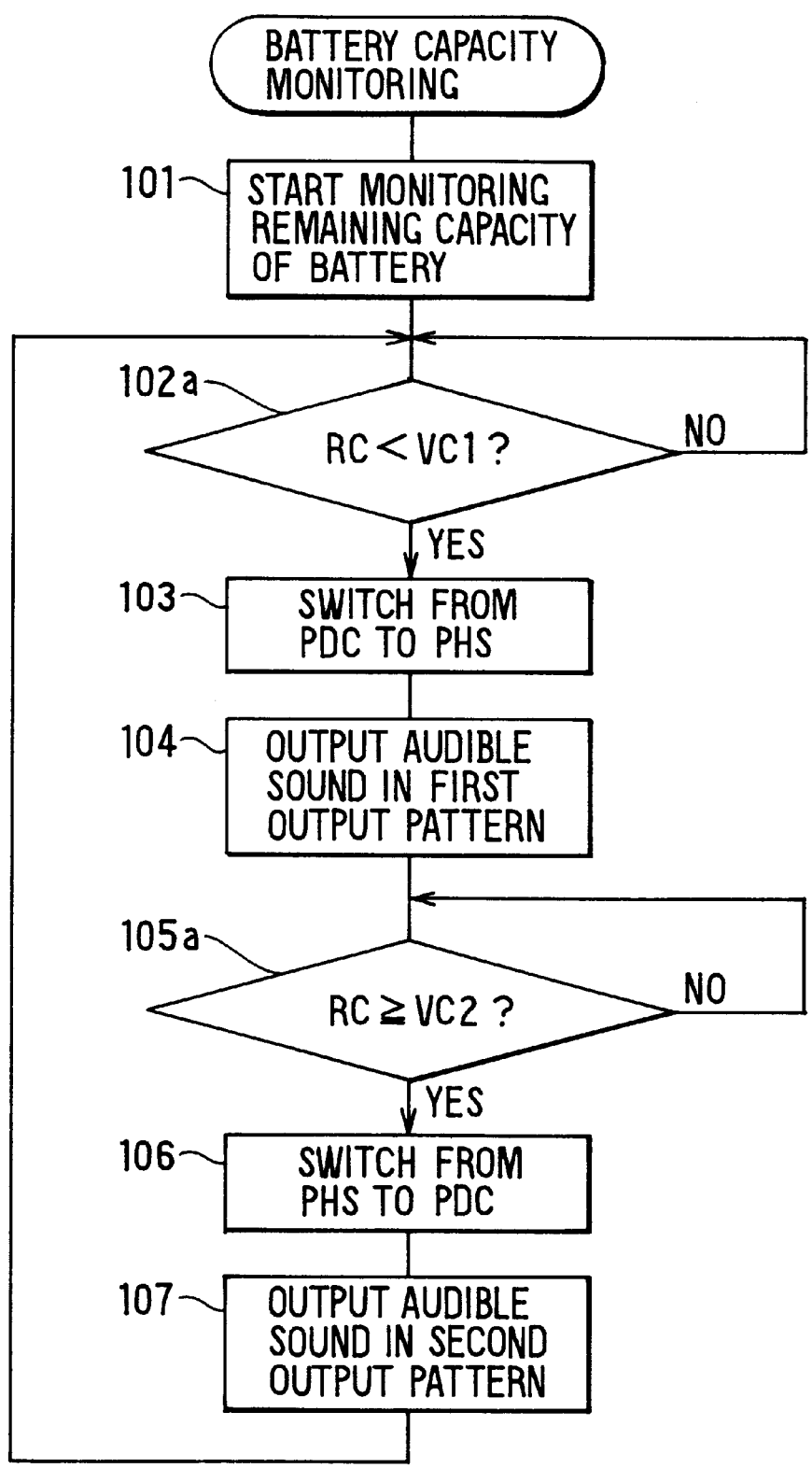
FIG. 5 is a flow diagram showing a battery capacity monitoring program of a wireless communication device according to a second embodiment of the present invention.

Specifically, as shown in FIGS. 5 and 6, the main controller 2 is programmed to compare the monitored capacity RC with two reference levels Vc1 and VC2 at steps 102a and 105a, respectively. Thus, the communication mode of the PDC/PHS phone 1 is switched from the PDC communication to the PHS communication when the remaining capacity of the battery 18 decreases below the first reference level VC1 (time t1 in FIG. 6). It is switched from the PHS communication back to the PDC communication again when the remaining capacity of the battery 18 increases to the second reference level VC2 (time t3 in FIG. 6) which is higher than the first reference level VC1.

According to the present embodiment, the PDC/PHS phone 1 is restricted from switching its communication mode from the PDC communication to the PHS communication again so soon after the switching from the PHS communication to the PDC communication at time t3.

Other Embodiments

The above embodiments may be modified as follows as other embodiments of the present invention.

The phone which the PDC/PHS phone 1 communicates with is not limited to the home phone 19, but may be other types such as another cellular phone which is capable of communication under the PDC and/or PHS protocol.

The PDC/PHS phone 1, particularly the main controller 2, may be so constructed as to enable only the switching of communication mode from the PDC communication to the PHS communication. It may also be so constructed as to enable an automatic switching of communication mode only from the PDC communication to the PHS communication and to enable manual switching of communication mode from the PHS communication to the PDC communication.

The PDC/PHS phone 1 need not be constructed to monitor the remaining capacity RC of the battery 18 in the course of communication, but may be so constructed as to monitor the same and switch the communication mode while waiting for transmission or reception of radio signals. For instance, because the PDC/PHS phone 1 consumes the electric power from the battery 18 as well even when it is in a waiting condition, the communication mode can be switched in the course of wait condition as long as it is detected that the battery 18 is running down. Thus, it can be avoided that the waiting is disabled unexpectedly.

In this instance, when the PDC/PHS phone 1 is in the wait condition with only its PDC communication part 3 being held operable, the PHS communication part 6 may alternatively be rendered operative in place of the PDC communication part 3 when the battery 18 is running down. Further, when the PDC/PHS phone 1 is in the wait condition with both of its PDC communication part 3 and PHS communication part 6 being held operative, only the PDC communication part 3 may first be held operative while disabling the PHS communication part 6 when the battery 18 runs down to less than a predetermined level to save the battery power. If the battery 18 runs down further to a much lower level, only the PHS communication part 6 may be switched to be operative while disabling the PDC communication part 3 so that the rate of power consumption may further be lessened.

In addition, wireless communication devices are not limited to the cellular phones but may be car phones. The communication parts are not limited to the PDC communication type and the PHS communication type, but may be a communication part which operates under a protocol of an analog cellular type. The communication parts are not limited to operate under protocols of TDMA (time-divided multiple access) and FDMA (frequency-divided multiple access), but may operate under a protocol of CDMA (code-divided multiple access) as well.

The PDC communication part is not limited to operate in 1.5 GHz frequency band which complies with the PDC communication protocol, but may be constructed to operate in other frequency bands, for instance, 800 MHz band, as long as it complies with the PDC communication protocol. The PDC antenna and the PHS antenna are not limited to a separate type, but may be a combined type which operates as the PDC antenna and the PHS antenna.

The speaker which is used as an indicator to inform a battery condition and communication mode switching may be replaced with a display or a vibrator as long as it is capable of indicating the same. The pattern of audible sound is not limited to the preliminarily stored one, but may be changed freely by users or may be selected freely from a plurality of preliminarily stored ones by users.

Further modifications and alterations are also possible without departing from the spirit of the invention.

What is claimed is:

1. A wireless communication device operable with a built-in battery and operable in different communication modes comprising:

a first communication part capable of communication with an opponent device through a first external communication network in a first communication mode in compliance with a communication protocol of the first external communication network;

a second communication part capable of communication with the opponent device through a second external communication network in a second communication mode in compliance with a communication protocol of the second external communication network, the second communication part being less power-consuming than the first communication part;

a battery monitoring part for monitoring a battery power of the battery when the first communication part is in communication operation with the opponent device; and a control part for automatically switching an operable communication part from the first communication part to the second communication part maintaining the communication operation with the opponent device in place of the first communication part and disconnect the first communication part from the first external communication network in response to an output of the battery monitoring part indicative of a decrease in the battery power to less than a predetermined level;

wherein the control part is further for automatically switching the operable communication part from the second communication part back to the first communication part thereby to connect the first communication part to the first external communication network and disconnect the second communication part from the second external communication network in response to an output of the battery monitoring part indicative of an increase of the battery power to the predetermined level.

2. The wireless communication device of claim 1, further comprising:

an indicator for indicating a switching of the operable communication part between the first communication part and the second communication part.

3. The wireless communication device of claim 1, wherein the first communication part is operable on a personal digital cellular type protocol and the second communication part is operable on a portable handy phone type protocol.

4. The wireless communication device of claim 1, wherein the control part is further for automatically switching the operable communication part in the course of a waiting condition before communication with the first external communication network.

5. The wireless communication device of claim 2, wherein the indicator is for indicating the switching of the operable communication part in different patterns between a switching from the first communication part to the second communication part and a switching from the second communication part the first communication part.

6. A device as in claim 1, wherein both the first communication mode and the second communication mode are bidirectional type communication modes.

7. A wireless communication device operable with a built-in battery and operable in different communication modes comprising:

a first communication part capable of communication with an opponent device through a first external communication network in a first communication mode in compliance with a communication protocol of the first external communication network;

a second communication part capable of communication with the opponent device through a second external communication network in a second communication mode in compliance with a communication protocol of the second external communication network, the second communication part being less power-consuming than the first communication part;

a battery monitoring part for monitoring a battery power of the battery when the first communication part is in communication operation with the opponent device; and a control part for automatically switching an operable communication part from the first communication part to the second communication part maintaining the communication operation with the opponent device in place of the first communication part and disconnect the first communication part from the first external communication network in response to an output of the battery monitoring part indicative of a decrease in the battery power to less than a predetermined level;

wherein the control part is further for automatically switching the operable communication part from the second communication part back to the first communication part thereby to connect the first communication part to the first external communication network and disconnect the second communication part from the second external communication network in response to an output of the battery monitoring part indicative of an increase of the battery power to another predetermined level higher than the predetermined level.

8. A device as in claim 7, wherein said another predetermined level is a power level that is lower than a full power of the battery.

9. A wireless communication method comprising:

performing communication with an opponent device by a first communication part of a communication device through a first external communication network under a first communication mode in compliance with a communication protocol of the first external communication network;

monitoring a battery power of a built-in battery of the communication device while the first communication part is in communication with the opponent device;

automatically switching an operable communication part from the first communication part to a second communication part in response to an output indicative of a decrease in the monitored battery power to less than a predetermined level, the second communication part performs communication with the opponent device through a second external communication network under a second communication mode in compliance with a communication protocol of the second external communication network, the second communication part being less power-consuming than the first communication part, thereby maintaining communication with the opponent device by the second communication part.

10. A method as in claim 9, wherein both the first communication mode and the second communication mode are bidirectional type communication modes.

11. A wireless communication device operable with a built-in battery and operable in different communication modes comprising:

a first communication part capable of communication with an opponent device through a first external communication network in a first communication mode in compliance with a communication protocol of the first external communication network;

a second communication part capable of communication with the opponent device through a second external communication network in a second communication mode in compliance with a communication protocol of the second external communication network, the second communication part being less power-consuming than the first communication part;

a battery monitoring part for monitoring a battery power of the battery when the first communication part is in communication operation with the opponent device; and a control part for switching an operable communication part from the first communication part to the second communication part maintaining the communication operation with the opponent device having been attained through the first external communication network using the second external communication network in response to an output of the battery monitoring part indicative of a decrease in the battery power to less than a predetermined level during communication through the first external communication network.

12. The wireless communication device of claim 11, wherein the control part is further for switching the operable communication part from the second communication part back to the first communication part thereby to connect the first communication part to the first external communication network and disconnect the second external communication part from the second external communication network in response to an output of the battery monitoring part indicative of an increase of the battery power to the predetermined level.

13. The wireless communication device of claim 11, wherein the control part is further for switching the operable communication part from the second communication part back to the first communication part thereby to connect the first communication part to the first external communication network and disconnect the second external communication part from the second external communication network in response to an output of the battery monitoring part indicative of an increase of the battery power to another predetermined level higher than the predetermined level.

14. A device as in claim 13, wherein said another predetermined level is a power level that is lower than a full power of the battery.

15. The wireless communication device of claim 11, further comprising:

an indicator for indicating a switching of the operable communication part between the first communication part and the second communication part.

16. The wireless communication device of claim 15, wherein the indicator is for indicating the switching of the operable communication part in different patterns between a switching from the first communication part to the second communication part and a switching from the second communication part the first communication part.

17. The wireless communication device of claim 11, wherein the first communication part is operable on a personal digital cellular type protocol and the second communication part is operable on a portable handy phone type protocol.

18. The wireless communication device of claim 11, wherein the control part is further for switching the operable communication part in the course of a waiting condition before communication with the first external communication network.

19. A device as in claim 11, wherein both the first communication mode and the second communication mode are bidirectional type communication modes.

* * * * *